HORIZONTAL FLYBACK SWEEP SYSTEM
Filed Nov. 14, 1966
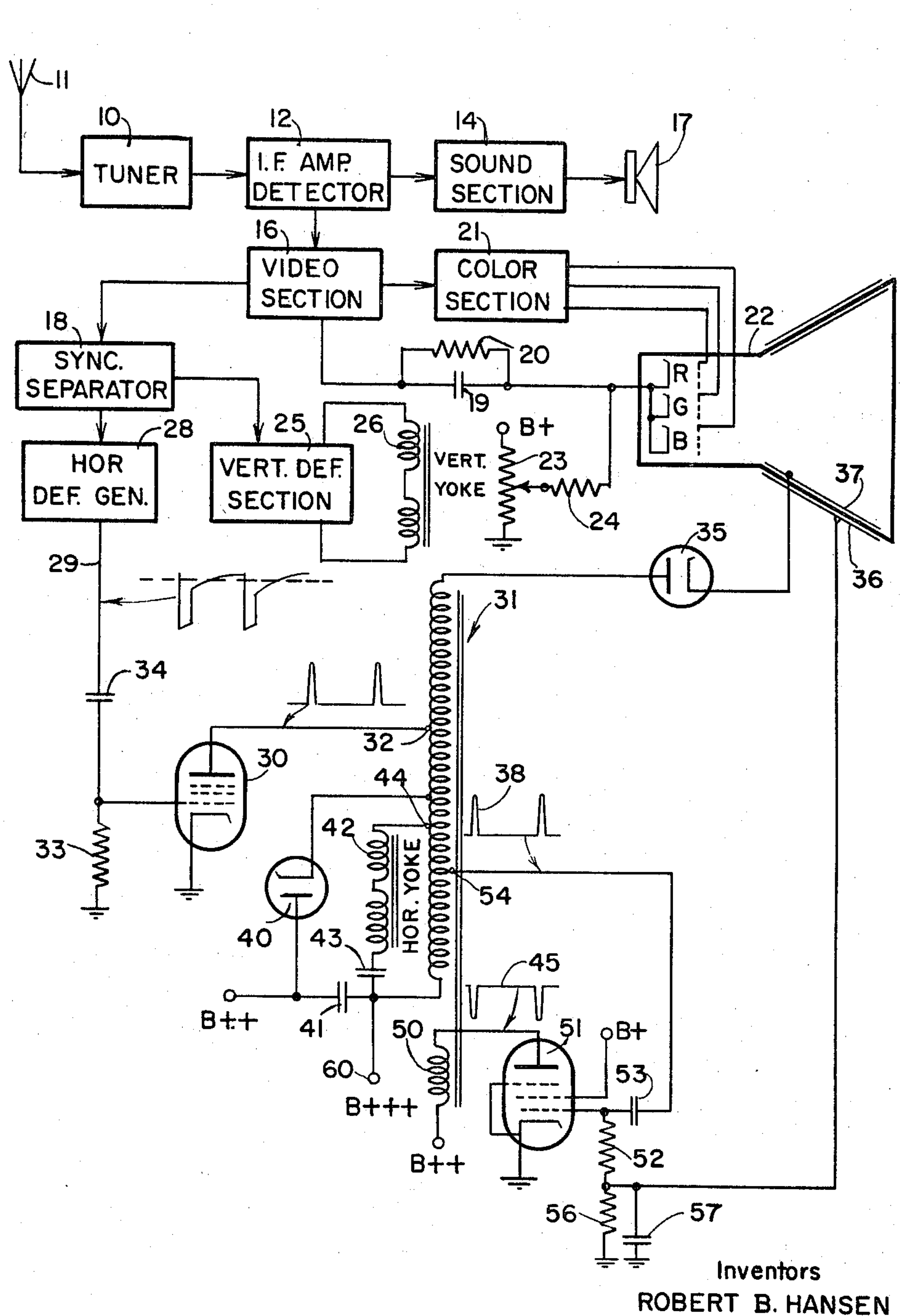
Inventors
ROBERT B. HANSEN
DON A. KRAMER.
BY
ATTYS.

United States Patent Office 3,430,096
Patented Feb. 25, 1969

3,430,096
HORIZONTAL FLYBACK SWEEP SYSTEM

Robert B. Hansen, Arlington Heights, and Don A. Kramer, Rolling Meadows, Ill., assignors to Motorola, Inc., Franklin Park, Ill., a corporation of Illinois Filed Nov. 14, 1966, Ser. No. 593,860
U.S. Cl. 315—22 7 Claims
Int. Cl. H01j 29/72

ABSTRACT OF THE DISCLOSURE

A flyback transformer of a television receiver includes an auxiliary winding. The voltage pulse developed in the flyback transformer during retrace time is coupled through an amplifier to the auxiliary winding to add to the high voltage developed in the flyback transformer. The gain of the amplifier is controlled by the magnitude of the picture tube beam intensity to provide a relative constant high voltage for the picture tube.

It has become a general practice in television art to obtain the high voltage required for the final accelerating electrode of the picture tube from a pulse type supply, in which high voltages are developed through rectification of the high amplitude, transient, flyback pulses appearing in the receiver's horizontal output transformer during retrace periods of the line scanning cycle, when cutoff of the horizontal output tube causes a sudden collapse of the magnetic field in the output transformer and horizontal deflection yoke. Since the electromagnetic horizontal deflection yoke and the transformer have a certain amount of inductance, stored energy is present in the coils and windings at the end of each deflection cycle. It is possible, through the use of a damping tube or diode to use a portion of such stored energy for producing a part of the wave employed in deflecting the cathode ray beam. The prior art circuits suffer the drawback of being somewhat unstable with respect to changes in the final anode current due to a change in picture brightness, which affects the beam sweep signal resulting in undesired changes in linearity of the picture displayed on the picture tube.

Accordingly, it is an object of this invention to provide a controlled horizontal flyback system which provides both controlled high voltage output potential and proper deflection circuit operation and where both functions can be optimized independently.

Another object is to provide an inexpensive power supply system which gives improvement in general linearity of the horizontal scan regardless of loading and which maintains substantially constant potentials despite the load variations.

In accordance with a particular form of the present invention a horizontal flyback power supply system for a television receiver comprises horizontal deflection means having a load circuit which includes an auto-transformer having a main winding and an auxiliary winding and a horizontal yoke coupled to the deflection means such that a voltage pulse is developed in the transformer during retrace time. The main winding has a plurality of terminals including an intermediate and a first end terminal whereas the auxiliary winding has second and third end terminals. The second terminal is connected to a B++ potential. The first end terminal is connected to a rectifying circuit for rectifying the pulses developed in the transformer to produce substantially a direct current voltage which is supplied to a high voltage electrode of a cathode ray picture tube. The cathode electrode of the picture tube is coupled to a video section and is supplied with video signals of varying amplitude. A control tube is connected to the third terminal of the auxiliary winding by its anode electrode and comprises further a second cathode electrode connected to ground potential. A control grid electrode of the control tube is coupled to an intermediate terminal of the main winding. A biasing circuit on the control grid is coupled to the outer Aquadag coating of the cathode ray tube whereby the biasing circuit develops a biasing potential which increases with increasing beam current. The potential controls the amount of additional energy fed to the main winding when the voltage pulse developed in the main winding is applied through the intermediate terminal to the control grid of the control tube and increases the conduction of the control tube during retrace time so that additional energy is coupled from the auxiliary winding to the main winding.

The invention is illustrated in the drawing which shows partly in block and partly schematic a color television receiver having a horizontal flyback power supply system according to the invention.

The color television receiver in the drawing comprises a tuner 10 connected to an antenna 11. The tuner selects a television signal and converts it to an intermediate frequency (IF) to be further amplified and demodulated in the IF amplifier and detector 12. A sound subcarrier of the signal is selected and coupled to a sound section 14 to be demodulated and amplified for operating the loudspeaker 17.

A composite color television signal is coupled to a video section 16. The output of the video section is a video signal which is coupled through capacitor 19 to the cathodes of picture tube 22. A resistor 20 connected across the capacitor 19 provides some amount of direct current coupling in the signal path of the video signal. The composite signal developed in the video section 16 is also coupled to the color section 21, where the chroma portion is demodulated and applied to the red, green and blue signal control grids of the picture tube 22 respectively. For controlling the brightness a potentiometer 23 is connected between ground potential and the power supply to properly bias the cathodes of the picture tube through a resistor 24. The composite video signal developed in the video section 16 is further coupled to a sync separator 18 where the portions for providing the vertical deflection signal are derived and applied to the vertical deflection section 25. The vertical deflection section provides vertical sawtooth sweep signals of 60 c.p.s. which are applied to the vertical deflection yoke 26 which is positioned on the neck of the picture tube 22.

The synchronizing portion of the composite video signal which is at the horizontal deflection frequency of 15.75 kc. is supplied from the sync separator 18 to a horizontal deflection wave generator 28 which produces horizontal deflection pulses available at the output lead 29.

The horizontal flyback power supply system comprises a horizontal output tube 30 the anode of which is connected to the winding of an auto-transformer 31 at point 32. The control grid of tube 30 is connected through resistor 33 to ground potential and through capacitor 34 to the output lead 29. The upper end of the output transformer 31 is connected to the anode of a high voltage rectifier tube 35 which develops a high voltage which is applied to the anode 37 of the picture tube 22.

Across a portion of the winding of the auto-transformer 31 is connected a damper diode 40 whose anode is connected to a source of positive potential indicated as "B++," thus completing the DC path of the anode circuit of the horizontal output tube 30. In series with the damper diode 40 is a boost capacitor 41 connected between the positive potential source and the lower end of transformer 31. A horizontal deflection yoke 42 in series with a capacitor 43 is connected between point 44 and the lower end of the winding of auto-transformer 31.

An auxiliary winding 50 of the transformer 31 is connected to the positive B++ potential source and to the anode of tube 51 which includes a cathode connected to ground potential and a control grid connected through resistor 52 also to ground potential and through capacitor 53 to the auto-transformer at the point 54. The screen grid of tube 51 is connected to B+.

The operation of the horizontal flyback power supply system will occur in the following manner. The negative horizontal deflection pulse available at the output lead 29 is supplied to the control grid of horizontal output tube 30 which serves as a switch to control the supply of energy of the horizontal deflection coils 42 through transformer 31. With the arrival of the negative deflection pulse on the grid of the horizontal output tube 30, the tube is cutoff for retrace time. The magnetic energy stored in the inductance of the transformer 31 and the yoke 42 now energize a resonant circuit consisting of the inductance of the transformer and the yoke and also the inherent capacitances. The conversion of energy in the resonant circuit during the first half cycle provides a positive voltage pulse in the transformer which also cuts off the damper diode 40 for retrace time. As soon as the voltage starts to swing negative at the beginning of the second half of the resonant cycle at the end of the retrace time, the damper diode 40 begins to conduct and charges the boost capacitor 41 for energy storage maintaining a voltage drop across the inductance at a constant value corresponding to the constant current increase starting with the most negative value at the end of retrace time. As current through the inductance approaches a value of zero, a modified sawtooth voltage following the trailing edge of the negative horizontal deflection pulse applied to the control grid of output tube 30 causes the output tube 30 to conduct discharging the boost capacitor 41 through the transformer 31 and rendering the damper diode 40 non-conductive for at least the retrace interval.

Since the electrical loading of the output transformer varies by the energy used for the accelerating anode 37 of the picture tube or in other words, the cathode ray beam intensity, and other utilization means energized by the energy of boost capacitor 41 which is available at terminal 60 as a high voltage B+++, a power driving circuit is coupled to the transformer 31. The positive voltage pulse 38 derived at point 54 is coupled through capacitor 53 to the control grid of tube 51 to render the tube 51 conductive and produce a negative-going pulse 45 which is inserted in the main winding of transformer 31 by properly selecting its polarity with respect to that of auxiliary winding 50. Thus a further amount of energy, shown as a pulsating signal 45, is coupled back to the main winding to increase the energy in the inductance in the form of a more positive-going high voltage pulse.

The advantage of the system according to the invention is that for a high voltage of a given level, less current handling capacity for the damper and less stored energy is required since the pulsating signal is introduced in the flyback system by tube 51 at the time when it is needed thereby improving the linearity characteristics of the scan.

When the television picture is of maximum brightness, the beam current drawn by the accelerating anode 37 from the horizontal flyback determines the beam intensity and will be of a maximum value.

Without the presence of this invention, the increased beam current would cause a reduction of the high voltage applied to anode 37. To prevent this, a biasing circuit comprising resistor 56 and capacitor 57 is interposed between the outer Aquadag coating 36 of cathode ray tube 22 and its usual ground connection. The voltage on coating 36 with the biasing circuit is only a small percentage of the high voltage applied to anode 37 so that the circuit will not impair proper operation of the cathode ray tube. As the beam current increases, a corresponding current increase through resistor 56 is observed so as to raise an automatic control voltage appearing thereacross. The voltage is filtered by capacitor 57 and applied through resistor 52 to the control electrode of tube 51. It may be appreciated that an increased voltage thereat will cause increased conduction of the tube so that the pulsating signal 45 injected into the main winding of transformer 31 will increase thereby effectuating an increase in the high voltage at anode 37 to overcome the attempted decrease resulting from the increased beam current.

The automatic control voltage for tube 51 is not necessarily limited to being derived from the outer Aquadag coating 36 but may be taken from any point in the receiver where there is an indication of the magnitude of the beam current.

What has been described, therefore, is a novel circuit for providing additional high voltage to the anode of a cathode ray tube when needed and which may include means for automatically adjusting the high voltage with changes in the beam current.

What is claimed is:

1. In a television receiver having a horizontal flyback system for deflecting the beam in a cathode ray tube including in combination; horizontal deflection means, a load circuit including a transformer and a horizontal deflection yoke coupled to said deflection means such that voltage pulses are developed in said transformer during beam retrace time, means coupled to said transformer for rectifying said pulses to produce substantially a direct current high voltage for the cathode ray tube, power driving circuit means coupled to said transformer and responsive to said voltage pulses during retrace time to induce a pulsating signal into said transformer, the television receiver further including control means coupled to said power driving circuit means to control the amplitude of said pulsating signal.

2. In a televesion receiver according to claim 1 said control means including a network responsive to the magnitude of the beam intensity coupled to said power driving circuit means to control the amplitude of said pulsating signal induced in said transformer in response to the magnitude of said beam intensity.

3. In a television received according to claim 1 in which said power driving circuit means includes an auxiliary winding magnetically coupled to said transformer and an electron control device having output means coupled to said auxiliary winding and input means coupled to said transformer and said control means, said device being responsive to said voltage pulses during beam retrace time to provide said pulsating signal in said output means, said pulsating signal being an amplified representation of said voltage pulses, said output means coupled to said auxiliary winding for inducing said pulsating signal through said auxiliary winding to said transformer.

4. In a television receiver according to claim 3 in which said electron control device is an electron tube having an anode and a control grid, said output means including said anode and said input means including said control grid.

5. In a television receiver having a cathode ray tube with a high voltage electrode and an outer Aquadag coating, a horizontal flyback system for deflecting the cathode ray beam including in combination; horizontal deflection means, a load circuit which includes a transformer and a horizontal deflection yoke coupled to said deflection means such that voltage pulses are developed in said transformer during beam retrace time, means coupled to said load circuit for rectifying said pulses to produce a direct current high voltage for the high voltage electrode of the cathode ray tube, power driving circuit means having input means connected to said transformer and responsive to said voltage pulses during beam retrace time to induce a pulsating signal into said transformer, said input means further being coupled to said outer Aquadag coating and responsive to the beam intensity to control the amplitude of said pulsating signal.

6. In a television receiver according to claim 5 in which said power driving circuit comprises an auxiliary winding magnetically coupled to said transformer and an electron control device having control and output electrodes, said control electrode coupled to said transformer, said device being responsive to said voltage pulses during beam retrace time to provide a pulsating signal on said output electrode, said input electrode also coupled to said outer Aquadag coating so that the magnitude of the beam intensity controls the response of the device to said voltage pulses and thus the amplitude of said pulsating signals, said output electrode coupled to said auxiliary winding for inducing said pulsating signal through said auxiliary winding to said transformer to keep the direct current high voltage substantially constant.

7. In a television receiver according to claim 6, in which said electron control device is an electron tube, said control electrode is a control grid and said output electrode is an anode.

References Cited

UNITED STATES PATENTS

| | | | |
|---|---|---|---|
| 2,559,078 | 7/1951 | Kell | 315—22 X |
| 2,825,849 | 3/1958 | Lufkin et al. | 315—27 |
| 2,956,235 | 10/1960 | Fischman | 315—27 X |

RODNEY D. BENNETT, *Primary Examiner.*

THEODORE H. TUBBESING, *Assistant Examiner.*

U.S. Cl. X.R.

315—27